United States Patent
Yu et al.

(10) Patent No.: US 8,495,397 B2
(45) Date of Patent: Jul. 23, 2013

(54) COMPUTER SYSTEM CAPABLE OF ADJUSTING OPERATING FREQUENCY DYNAMICALLY

(75) Inventors: Ching-Hsiang Yu, Taipei (TW); Tai-Tsung Chang, Taipei (TW)

(73) Assignee: Elitegroup Computer Systems Co., Ltd., Taipei (TW)

( * ) Notice: Subject to any disclaimer, the term of this patent is extended or adjusted under 35 U.S.C. 154(b) by 105 days.

(21) Appl. No.: 13/176,100

(22) Filed: Jul. 5, 2011

(65) Prior Publication Data

US 2012/0011377 A1    Jan. 12, 2012

Related U.S. Application Data

(60) Provisional application No. 61/362,807, filed on Jul. 9, 2010.

(51) Int. Cl.
*G06F 1/26* (2006.01)

(52) U.S. Cl.
USPC .............................. 713/300; 713/322; 713/600

(58) Field of Classification Search
USPC ......................................... 713/300, 322, 600
See application file for complete search history.

(56) References Cited

U.S. PATENT DOCUMENTS

| | | | | |
|---|---|---|---|---|
| 2009/0235108 A1* | 9/2009 | Gold et al. | ...................... | 713/500 |
| 2010/0115300 A1* | 5/2010 | Wu et al. | ........................ | 713/300 |
| 2011/0283117 A1* | 11/2011 | Krig | .............................. | 713/300 |

* cited by examiner

Primary Examiner — Albert Wang
(74) Attorney, Agent, or Firm — Rosenberg, Klein & Lee

(57) ABSTRACT

The present invention relates to a computer system capable of adjusting the operating frequency dynamically and comprises at least a processor voltage-adjusting unit, a clock-generating circuit, at least a load-detecting unit, and a control unit. The processor voltage-adjusting unit and the clock-generating circuit produce a processor operating voltage and a clock signal, respectively, and transmit them to the processor. The load-detecting unit detects the processor for producing a detecting signal related to the load of the processor. The control unit produces a clock-adjusting signal and a processor voltage-adjusting signal according to the detecting signal and controls the processor voltage-adjusting unit and the clock-generating circuit, respectively. Thereby, the control unit can adjust the operating voltage of the processor as well as the frequency of the clock signal and hence adjusting the operating frequency of the processor. According, the purpose of adjusting the performance of the computer system dynamically can be achieved.

11 Claims, 5 Drawing Sheets

| Clock signal(MHz) | Voltage adjustment | Frequency of CPU | Operating voltage of CPU | Operating current of CPU | Operating power of CPU | Operating voltage of GPU | Operating current of GPU | Power | Total power |
|---|---|---|---|---|---|---|---|---|---|
| 133 | 0 | 2138 | 1.1200V | 9A | 10.08W | 1.1V | 10A | 10.1W | 20.18W |
| 138 | +0.0125V | 2213 | 1.1325V | 10A | 11.32W | 1.1V | 10A | 10.1W | 21.42W |
| 143 | +0.0250V | 2298 | 1.1450V | 10.5A | 12.02W | 1.1V | 10A | 10.1W | 22.12W |
| 148 | +0.0500V | 2273 | 1.1700V | 10.8A | 12.63W | 1.1V | 10A | 10.1W | 22.73W |
| 153 | +0.0750V | 2458 | 1.1750V | 11.2A | 13.16W | 1.1V | 10A | 10.1W | 23.26W |
| 158 | +0.1000V | 2533 | 1.2200V | 11.6A | 14.15W | 1.1V | 10A | 10.1W | 24.25W |
| 163 | +0.1250V | 2618 | 1.2450V | 12A | 14.94W | 1.1V | 10A | 10.1W | 25.04W |
| 168 | +0.1500V | 2704 | 1.2700V | 12.5A | 15.87W | 1.1V | 10A | 10.1W | 25.97W |
| 173 | +0.1875V | 2778 | 1.3075V | 13A | 16.90W | 1.1V | 10A | 10.1W | 27.00W |

Look-up table

FIG.4

COMPUTER SYSTEM CAPABLE OF ADJUSTING OPERATING FREQUENCY DYNAMICALLY

REFERENCE TO RELATED APPLICATIONS

This Application is based on Provisional Patent Application Ser. No. 61/362,807, filed 9 Jul. 2010.

FIELD OF THE INVENTION

The present invention relates generally to a computer system, and particularly to a computer system capable of adjusting the operating frequency dynamically for improving its performance.

BACKGROUND OF THE INVENTION

Because of rapid development of modern personal computers, users may easily find that the operating speed and functionality of a Central Processing Unit (CPU) increase day by day. Since Intel launched the CPU working at 25 MHz, computers have kept developing for years and CPUs with operating frequencies of 300, 500, and 600 MHz were introduced continuously. Nowadays, the operating frequency of the CPU in a computer system has reached above 3 GHz. Nonetheless, the prices of CPUs get higher and higher accordingly. Thereby, in order to improve the processing speed of a CPU without purchasing a new one, over-frequency is often adopted. The principle of over-frequency of a CPU is to increase its operating frequency for improving its processing speed.

Currently, over-frequency of a general computer system is achieved by adjusting the core voltage and external frequency (the frequency of system bus) of the CPU. The adjusting method includes adjusting via the Basic Input/Output System (BIOS) or via the Graphical User Interface (GUI). A user configures the relevant parameters. Afterwards, the computer system has to be restarted for executing the new parameters. In addition, because the new parameters might not be appropriate values, the computer system may encounter abnormal start-up or halt without further operations. Alternatively, the computer system may operate unstably, and then encounter problems after a period of time. In such circumstances, it is required to reconfigure the parameters via the BIOS or the GUI until the computer system can start and operate stably. According to the description above, although over-frequency of a CPU may give the highest operating frequency, the adjusting efficiency is extremely low because a user needs to configure the parameters and restart the computer system repeatedly and tediously.

Moreover, from the perspective of a computer system, the computer system might halt, shut down, or even the electronic components, such as the CPU, might be burned caused by the problems of insufficient system power or bad heat dissipation during over-frequency if the maximum tolerance of the total power consumption and the design of power supply, as well as the limitations of the overall heat dissipation, are not taken into considerations. Besides, the current over-frequency designs use fixed parameters. In other words, after the parameters are configured to determine the operating frequency of a CPU, the CPU will operate at this fixed operating frequency once the computer system is restarted. Thereby, under all circumstances, the CPU will process all events using a higher operating frequency. For portable devices containing batteries, the battery time will be reduced drastically once it operates in the battery mode because the CPU is over-frequency operating and consumes higher battery power.

Accordingly, the present invention provides a computer system capable of adjusting the operating frequency dynamically. Not only solving the drawbacks described above, the performance of the computer system is also improved and power is saved as well.

SUMMARY

An objective of the present invention is to provide a computer system capable of adjusting the operating frequency dynamically. The computer system can adjust the operating voltage and frequency of the processor real-timely and dynamically according to the loading status of the processor for achieving the purposes of improving the performance of the computer system as well as saving power.

Another objective of the present invention is to provide a computer system capable of adjusting the operating frequency dynamically. The computer system judges if its total power consumption exceeding a power threshold value. When the total power consumption is greater than the power threshold value, the operating frequency of the processor is reduced for stabilizing the operation of the computer system.

Still another objective of the present invention is to provide a computer system capable of adjusting the operating frequency dynamically. The computer system adjusts the operating frequency of the processor according to its heat for stabilizing the operation of the computer system.

The computer system capable of adjusting operating frequency dynamically according to the present invention is used for adjusting the operating frequency of at least a processor in a computer system and comprises at least a processor voltage-adjusting unit, a clock-generating circuit, at least a load-detecting unit, and a control unit. The processor voltage-adjusting unit produces a processor operating voltage and transmits it to the processor. The clock-generating circuit produces a clock signal and transmits it to the processor for determining the operating frequency of the processor. The load-detecting unit is used for detecting the operating status of the processor and producing a detecting signal, which is related to the load of the processor. The control unit produces a processor voltage-adjusting signal and a clock-adjusting signal according to the detecting signal. The processor voltage-adjusting unit adjusts the operating voltage according to the processor voltage-adjusting signal. The clock-generating circuit adjusts the frequency of the clock according to the clock-adjusting signal and hence adjusting the operating frequency of the processor. The computer system according to the present invention adjusts the operating frequency real-timely and dynamically according to the loading status of the processor while the computer system is operating. Thereby, the performance of the computer system can be enhanced.

BRIEF DESCRIPTION OF THE DRAWINGS

FIG. 4 shows a comparison table according to a preferred embodiment of the present invention.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
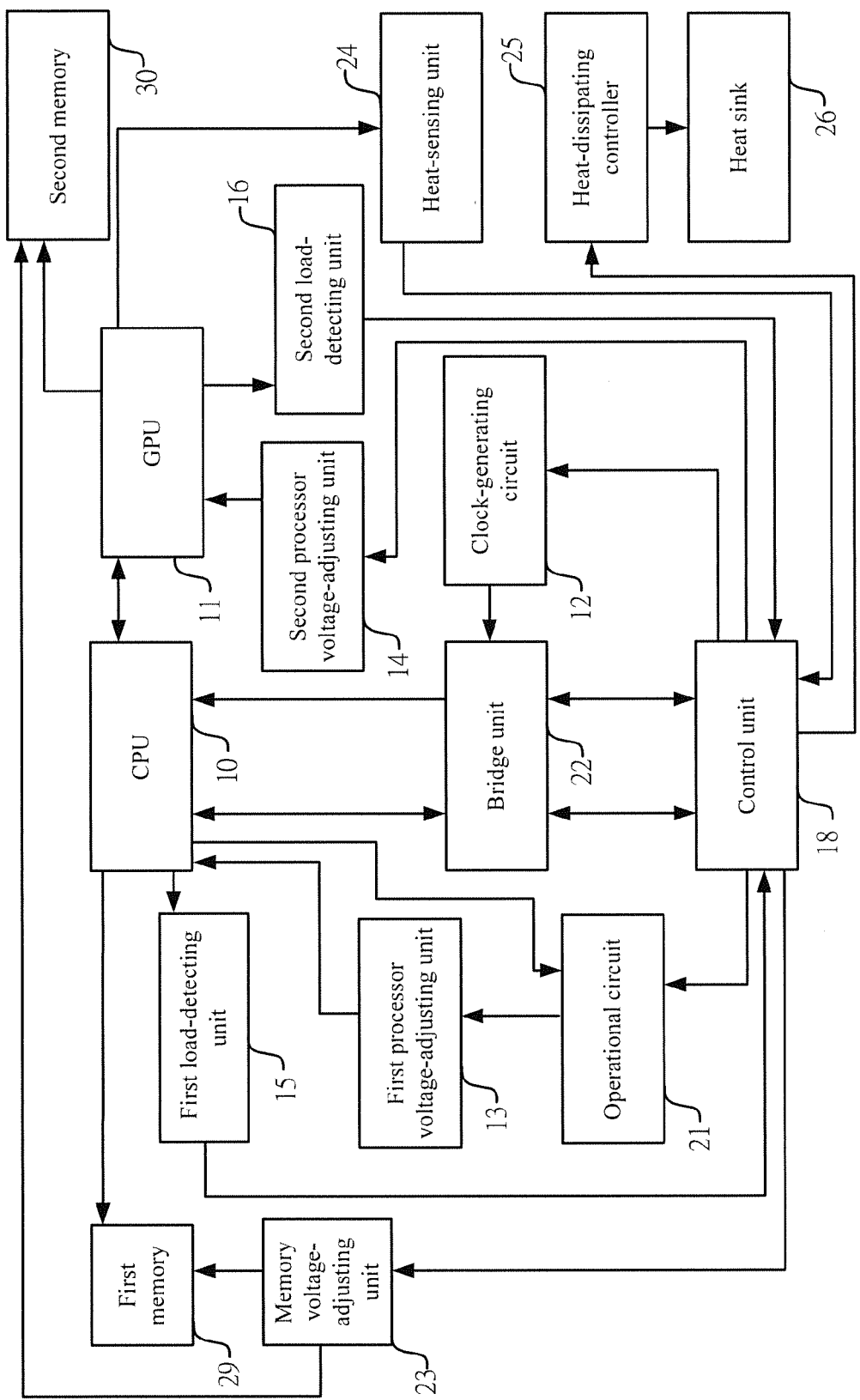
FIG. 1 shows a block diagram according to a preferred embodiment of the present invention.

FIG. 1 shows a block diagram according to a preferred embodiment of the present invention. The computer system capable of adjusting the operating frequency dynamically according to the present invention adjusts the operating frequency, for example, to over-frequency or under-frequency, of the processor in the computer system real-timely and dynamically for improving the performance and stability of the computer system. The computer system according to the present invention can adjust the operating frequency of any processor, such as the CPU or the Graphic Processing Unit (GPU), disposed therein but not merely the CPU.

According to the embodiment shown in FIG. 1, the computer system according to the present invention adjusting the operating frequencies of a first processor and a second processor therein is used an example for description. The first and the second processors are the CPU 10 and GPU 11, respectively. As shown in the figure, the present invention comprises a clock-generating circuit, at least a processor voltage-adjusting unit, at least a load-detecting unit, and a control unit 18. According to the present embodiment, the processor voltage-adjusting unit includes a first processor voltage-adjusting unit 13 and a second processor voltage-adjusting unit 14; the load-detecting unit includes a first load-detecting unit 15 and a second load-detecting unit 16. The clock-generating circuit 12 is used for generating a clock signal and transmits the clock signal to the CPU 10 via a bridge unit 22 for determining the operating frequency of the CPU 10. The frequency of the clock signal is the frequency of the system bus in the computer system. Thereby, the clock signal will determine the operating frequency of the CPU 10. Inside the GPU 11, there is a clock generating circuit (not shown in the figure) for providing clock signal to the GPU 11 as well as determining the operating frequency of the GPU 11. The bridge unit 22 described above is coupled between the CPU 10 and the control unit 18.

The first processor voltage-adjusting unit 13 and the second processor voltage-adjusting unit 14 produce a processor operating voltage, respectively. According to the present embodiment, the processor operating voltages are a first processor operating voltage and a second processor operating voltage, which are transmitted to the CPU 10 and GPU 11 to act as their core voltage. The first load-detecting unit 15 is used for detecting the operating status of the CPU 10, for example, detecting the core current of the CPU 10, and producing a detecting signal. Alternatively, the CPU's executed commands, types of events processed, temperature, or heat can be detected. Thereby, the loading status of the CPU 10 is known according to the detecting signal. An embodiment of the first load-detecting unit 15 can be current-detecting unit, a hardware circuit, or a software program. Likewise, the second load-detecting unit 16 can be used for detecting the operating status of the GPU 11 and producing the detecting signal for giving the loading status of the GPU 11.

Refer again to FIG. 1. The control unit 18 is coupled to the first load-detecting unit 15, and produces a clock-adjusting signal and at least a processor voltage-adjusting signal according to the detecting signal. According to the present embodiment, the processing voltage-adjusting signal includes a first processor voltage-adjusting signal and a second processor voltage-adjusting signal. An embodiment of the control unit 18 is an embedded controller (EC). The clock-adjusting signal is used for controlling the clock-generating circuit and thereby adjusting the frequency of the clock signal. Hence, the operating frequency of the CPU 10 can be adjusted. For increasing the efficiency of the over-frequency CPU 10, according to the present invention, before increasing the operating frequency of the CPU 10, the first processor voltage-adjusting signal controls the first processor voltage-adjusting unit 13 for raising the intensity of the operating voltage of the first processor. An embodiment of the first processor voltage-adjusting unit 13 is a pulse-width-modulation (PWM) circuit. In addition, according to another embodiment of the present invention, the CPU 10 can also produce a voltage-adjusting signal for controlling the first processor voltage-adjusting unit 13 to adjust the operating voltage of the first processor. Thereby, the present invention further comprises an operating unit 21 coupled to the CPU 10 and the control unit 18 for operating the voltage-adjusting signal of the CPU 10 and the first processor voltage-adjusting signal of the control unit 18 and producing a voltage control signal for controlling the first processor voltage-adjusting unit 13 to adjust the operating voltage of the first processor. The voltage control signal is the sum of the values to be adjusted by the CPU 10 and the control unit 18.

Likewise, the control unit 18 will produce the second processor voltage-adjusting signal according to the detecting signal of the second load-detecting unit 16 for controlling the operating voltage of the second processor of the second processor voltage-adjusting unit 14 and thereby adjusting the core voltage of the GPU 11. Besides, the control unit 18 also will adjust the frequency of the clock signal of the GPU 11 according to the detecting signal for adjusting the operating frequency of the GPU 11. According to an embodiment of the present invention, the GPU 11 has various execution modes corresponding to various operating frequencies. The control unit 18 drives the GPU 11 to enter the appropriate execution mode according to the detecting signal for adjusting the operating frequency of the GPU 11. The signal according to which the control unit 18 drives the GPU 11 to enter various execution modes described above is equivalent to the clock-adjusting signal.

The control unit 18 according to the present invention knows the loading status of the CPU 10 and the GPU 11 according to the detecting signals of the first and second load-detecting units 15, 16 and thereby judges if the loads of the CPU 10 and the GPU 11 exceeds a load threshold value. If the load is not greater than the load threshold value, it means that the load is not heavy and over-frequency is required. When the load is greater than the load threshold value and over-frequency is needed, the control unit 18 will raise the operating voltage as well the frequency of the clock signal of the CPU 10 and the GPU 11.

In FIG. 1, the computer system further comprises at lease a memory. According to the present embodiment, the computer system has a first memory 29 and a second memory 30. The first memory 29 is coupled to the CPU 10; the second memory 30 is coupled to the GPU 11. The CPU 10 and the GPU 11 will transmit an operating clock to the first memory 29 and the second memory 30, respectively. Thereby, the operating frequencies of the first and the second memories 29, 30 determine the frequency of the operating clock transmitted by the CPU 10 and the GPU 11. The frequency of the operating clock transmitted by the CPU 10 is related to the operating frequency of the CPU 10; the frequency of the operating clock transmitted by the GPU 11 is related to the operating frequency of the GPU 11. Accordingly, after the operating frequencies of the CPU 10 and the GPU 11 are adjusted, the operating frequencies of the first and the second memories 29, 30 are adjusted simultaneously. The adjusting circuit according to the present invention further comprises a memory voltage-adjusting unit 23, which produces a memory operating voltage and transmits it to the first and the second memories 29, 30. When the control unit 18 according to the present invention controls the first and the second processor voltage-adjusting units 13, 14 to adjust the operating voltages of the first and the second processors, the control unit 18 also produces a memory voltage-adjusting signal for controlling the memory voltage-adjusting unit 23 to adjust the operating voltage of the memories.

The present invention further comprises a heat-sensing unit 24, a heat-dissipating controller 25, and a heat sink 26. The heat-sensing unit 24 senses the heat of the GPU 11 for producing a sensing signal. After the control unit 18 receives the sensing signal, it produces a heat-dissipating adjusting signal according to the sensing signal and drives the heat-dissipating controller 25 to produce a heat-dissipating control signal for controlling the operation and heat-dissipating efficiency of the heat sink 26. For example, when the control unit 18 knows that the temperature of the GPU 11 is excessive, it will drive the heat-dissipating controller 25 to control the heat sink 26 for increasing heat-dissipating efficiency. If, for example, the heat sink 26 is a fan, then the spinning speed of the fan is increased for preventing the GPU 11 from abnormal operations due to overheat. The heat-sensing unit 24 described above can also sense the heat of the CPU 10 for providing the control unit 18 to control the heat sink used for dissipating heat from the CPU 10.

Furthermore, the control unit 18 can also produce the first processor voltage-adjusting signal, the second processor voltage-adjusting signal, and the clock-adjusting signal according to the sensing signal for controlling the first and the second processor voltage-adjusting units 13, 14 to adjust the first processor operating voltage and the second processor voltage-adjusting signal and controlling the clock-generating circuit 12 to adjust the frequency of the clock signal. Thereby, the operating frequencies of the CPU 10 as well as the GPU 11 can be reduced and thus reducing their temperature and avoiding overheat.

Figure 2:
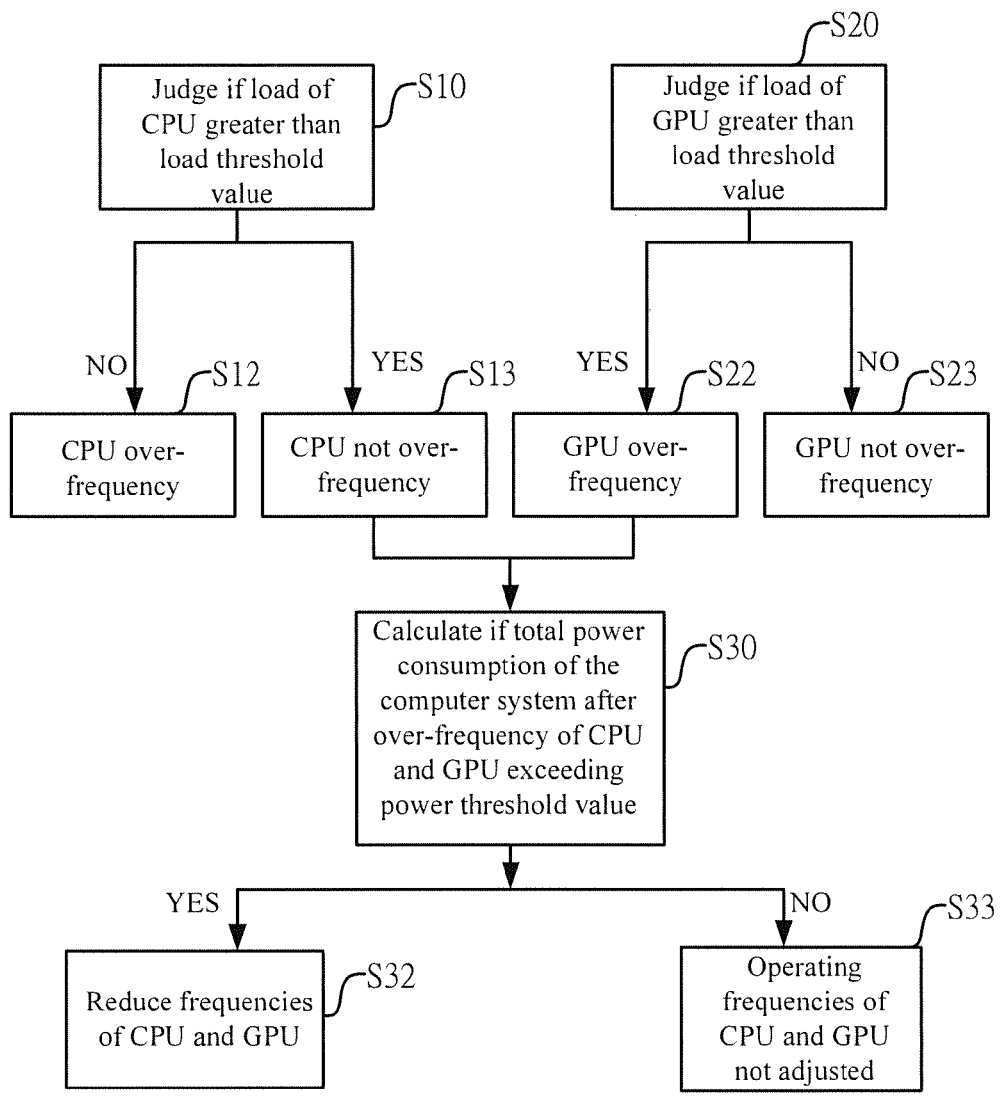
FIG. 2 shows a flowchart of adjusting the operating frequency of the processor dynamically according to a preferred embodiment of the present invention.

FIG. 2 shows a flowchart of adjusting the operating frequency of the processor dynamically according to a preferred embodiment of the present invention. The present embodiment uses over-frequency of the CPU 10 and the GPU 11 as an example. As shown in the figure, firstly in the step S10, the first load-detecting unit 15 detects the operating status of the CPU 10 for knowing the loading status of the CPU 10. The control unit 18 judges if the load of the CPU 10 exceeds the load threshold value according to the detecting signal of the first load-detecting unit 15. If the load is not greater than the load threshold value, it means that the CPU is not heavily loaded, and thereby, as shown in the step S12, over-frequency of the CPU 10 is not needed. On the other hand, when the load is greater than the load threshold value, as shown in the step S13, over-frequency of the CPU 10 is required. At this moment, the control unit 18 will produce the first processor voltage-adjusting signal and the clock signal for controlling the first processor voltage-adjusting unit 13 to raise the operating voltage of the first processor and controlling the clock-generating circuit 12 to increase the frequency of the clock signal.

As shown in the step S20, the second load-detecting unit 16 detects the operating status of the GPU 11 for judging if the load of the GPU 11 exceeds the load threshold value. If not, as shown in the step S22, over-frequency of the GPU 11 is not required; if yes, as shown in the step S23, the control unit 18 raises the operating voltage and frequency of the GPU 11. The load threshold value described above can be configured according to the requirements.

According to the present invention, in order to avoid excessive consumption of total power of the computer system and affecting its stability, as shown in the step S30, after executing over-frequency of the CPU 10 and the GPU 11, the control unit 18 will computer total power consumption of the computer system and judge if the total power consumption exceeds a power threshold value. If the total power consumption is greater than the power threshold, the step S32 is executed, in which the control unit 18 reduces the operating frequency and voltage of the CPU 10 and the GPU 11 for reducing the total power consumption of the computer system. Besides, the control unit 18 can also reduce the operating frequency and voltage of the CPU 10 only or the GPU 11 only. If the total power consumption is smaller than the power threshold, as shown in the step S33, the control unit 18 does not adjust the operating frequency of the CPU 10 and the GPU 11. The control unit 18 according to the present invention knows the power output by the power supply of the computer system, and hence knowing the total power consumption of the computer system. In addition, the control unit 18 samples and knows the total power consumption of the computer system for each fixed sampling time. It then averages the acquired total power consumption and thus preventing erroneous judgments. Moreover, the control unit 18 can know the power consumption of the CPU 10 and the GPU 11 through the detecting signals of the first and the second load-detecting units 15, 16.

Figure 3:
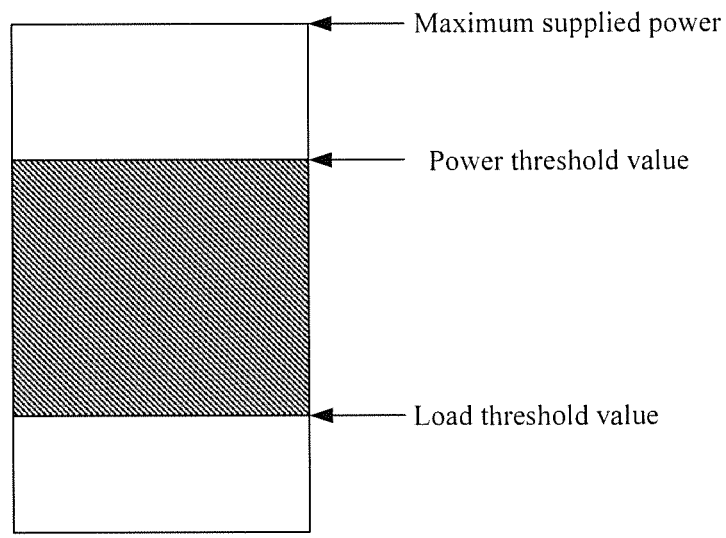
FIG. 3 shows a schematic diagram of the load threshold value, the power threshold value, and the maximum supplied power according to the present invention.

FIG. 3 shows a schematic diagram of the load threshold value, the power threshold value, and the maximum supplied power according to the present invention. As shown in the figure, the load threshold value according to the present invention is lower than the power threshold value; the power threshold value is lower than the maximum supplied power allowable by the power supply of the computer system. Because the power threshold value according to the present invention is lower than the maximum supplied power, it is ensured that the total power consumption of the computer system will not exceed the maximum supplied power allowable by the power supply, and hence enhancing the stability of the computer system.

When the control unit 18 according to the present invention adjusts the operating frequency of the processor in the computer system, it produces the processor voltage-adjusting signal the clock-adjusting signal according to a look-up table (as shown in FIG. 4) for adjusting the operating voltage and frequency of the processor. The values of the operating voltage and the values of the frequency of the clock signal in the look-up table are all tested, and thereby are applicable to the computer system and will not affect the stability of the computer system. The look-up table in FIG. 4 is applied to adjusting the operating voltage and frequency of the CPU 10. The voltage adjustment in the look-up table is the voltage value to be increased expressed by the first processor voltage-adjusting signal. For example, the operating voltage of the CPU 10 is originally 1.12V; the frequency of the clock signal and the operating frequency are 133 MHz and 2138 MHz, respectively. When the control unit 18 controls the first processor voltage-adjusting unit 13 to increase the operating voltage by 0.0125V and becoming 1.1325V, the clock-generating circuit 12 can increase the frequency of the clock signal to 138 MHz. Thereby, the operating frequency of the CPU 10 can be increased to 2213 MHz. The control unit 18 according to the present invention will adjust the operating voltage and the frequency of the clock signal gradually for executing over-frequency of the operating frequency of the CPU 10 step by step.

In general, two distinct processors do not need to be both in the high-performance status. For instance, when the CPU 10 is performing MPEG2 coding/decoding, the CPU 10 needs over-frequency while the GPU 11 needs not. At this moment, if slight under-frequency is performed on the GPU 11 for reducing the total power consumption of the computer system, the over-frequency range of the CPU 10 will be increased and further increasing the operating frequency of the CPU 10. Thereby, the performance of the computer system can be maximized Likewise, over-frequency is required when the GPU 11 is executing 3D video playback. Meanwhile, over-frequency is not necessary for the CPU 10. Then, under-frequency can be performed on the CPU 10 for increasing the over-frequency range of the GPU 11.

Figure 5:
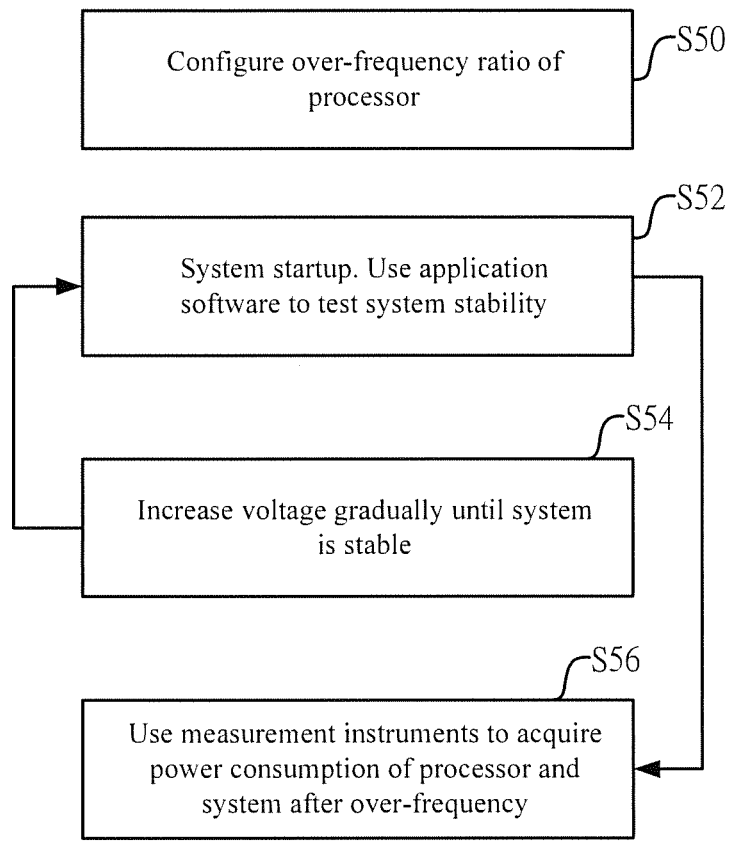
FIG. 5 shows a flowchart of establishing the comparison table according a preferred embodiment of the present invention.

FIG. 5 shows a flowchart of establishing the comparison table according a preferred embodiment of the present invention. First, as the step S50, configure the over-frequency ratio of the processor, for example, the CPU 10 or the GPU 11. Next, as shown in the step S52, start the computer system and use application software to test the stability of the computer system. This application software is used for testing if abnormal operating conditions, such as halts or errors, occur during the operation of the computer system and telling if the computer system is stable or not. Because the application software is a testing program normally seen today, it will be described in more details. If the testing result by the application software shows that the computer system is in a stable status, it means that the current operating voltage matches the adjusted frequency of the clock signal. Then, the step S56 is executed for acquiring the power consumption, as well as other relevant statuses shown in the look-up table, of the processor and the computer system by using measurement instruments. If the application software reports that the computer system is in an unstable status, the step S54 is executed for raising the operating voltage of the processor gradually until the computer system is stable. The voltage adjustment and the frequency of the clock signal in the look-up table are stable values and applicable to the computer system. Thereby, instability of the computer system can be prevented once over-frequency of the processor is performed.

To sum up, the computer system capable of adjusting the operating frequency dynamically according to the present invention adjusts the operating frequency of the computer real-timely and dynamically without needing to restart the computer system according to the loading status of the processor in the computer system while the computer system is operating. When the computer system according to the present invention adjusts the operating frequency of the processor according to the loading status of the processor in the computer system, the operating voltage of the processor will be adjusted for stabilizing the operating status of the processor. Afterwards, the frequency of the clock signal provided to the processor is adjusted for adjusting the operating frequency of the processor. Thereby, when the load of the computer system is increased, the operating frequency of the processor is raised real-timely and thus enhancing the processing performance of the computer system.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A computer system capable of adjusting the operating frequency dynamically, adjusting dynamically an operating frequency of at least one of a plurality of processors therein, the processors including a CPU and a GPU, and comprising:
    at least a processor voltage-adjusting unit, producing a processor operating voltage, and transmitting said processor operating voltage to said processor;
    a clock-generating circuit, producing a clock signal, and transmitting said clock signal to said processor for determining said operating frequency of said processor;
    at least a load-detecting unit, detecting an operating status of said processor, and producing a detecting signal related to a load of said processor; and
    a control unit, producing a clock-adjusting signal and a processor voltage-adjusting signal according to said detecting signal and a power threshold value for adjusting said operating frequency of said processor and said processor operating voltage, the power threshold value being lower than a maximum supplied power from a power supply;
    where said processor voltage-adjusting unit adjusts said processor operating voltage according to said processor voltage-adjusting signal and said clock-generating circuit adjusts a frequency of said clock signal for dynamically adjusting the CPU or the GPU according to said clock-adjusting signal for adjusting said operating frequency of said processor, the adjusting of the CPU correlated to the adjusting of the GPU.

2. The computer system of claim 1, and further comprising an operational circuit, operating a voltage-adjusting signal of said processor and said processor voltage-adjusting signal of said control signal and producing a voltage control signal for controlling said processor voltage-adjusting unit to adjust said processor operating voltage.

3. The computer system of claim 1, and further comprising a bridge unit, coupled between said processor and clock-generating circuit, transmitting said clock signal to said processor, and further coupled between said processor and said control unit.

4. The computer system of claim 1, and further comprising a memory voltage-adjusting unit, producing a memory operating voltage, and transmitting said memory operating voltage to at least a memory of said computer system; where said processor transmits an operating clock to said memory for determining an operating frequency of said memory; said operating clock is related to said operating frequency of said processor; said control unit produces a memory voltage-adjusting signal according to said detecting signal; and said memory voltage-adjusting unit adjusts said memory operating voltage according to said memory voltage-adjusting signal.

5. The computer system of claim 1, wherein said control unit produces said processor voltage-adjusting signal and said clock-adjusting signal according to said detecting signal and a load threshold value; and said control unit controls said processor voltage-adjusting unit to raise said processor operating voltage and controls said clock-generating circuit to raise said frequency of said clock signal when said load of said processor is greater than said load threshold value according to said detecting signal.

6. The computer system of claim 5, wherein said control unit judges if the total power consumption of said computer system is greater than the power threshold value; and said control unit produces said processor voltage-adjusting signal and said clock-adjusting signal correspondingly for controlling said processor voltage-adjusting unit to reduce said processor operating voltage and controlling said clock-generating circuit to reduce said frequency of said clock signal when said total power consumption is greater than said power threshold value.

7. The computer system of claim 1, wherein said control unit produces said processor voltage-adjusting signal and said clock-adjusting signal according to a look-up table for controlling said processor voltage-adjusting unit to adjust said processor operating voltage and controlling said clock-generating circuit to adjust said frequency of said clock signal.

8. The computer system of claim 1, and further comprising a heat-sensing unit, sensing heat of said processor and producing a sensing signal; where said control unit produces said processor voltage-adjusting signal and said clock-adjusting signal according to said sensing signal for controlling said processor voltage-adjusting unit to adjust said processor operating voltage and controlling said clock-generating circuit to adjust said frequency of said clock signal.

9. The computer system of claim 1, and further comprising: a heat sink, dissipating heat of said processor; a heat-sensing unit, sensing heat of said processor, producing a sensing signal, and said control unit producing a heat-dissipating adjusting signal according to said sensing signal; and a heat-dissipating controller, producing a heat-dissipating control signal according to said heat-dissipating adjusting signal, and controlling the operation of said heat sink.

10. The computer system of claim 1, wherein said plurality of processors include a first processor and a second processor; and said control unit reduces said operating frequency of said second processor when said control unit raises said operating voltage and said operating frequency of said first processor.

11. The computer system of claim 1, wherein said load-detecting unit is a current-sensing unit for sensing a current of said processor.

* * * * *